(12) United States Patent
Crook (10) Patent No.: US 6,284,391 B1
(45) Date of Patent: Sep. 4, 2001

(54) MERCAPTOFUNCTIONAL SILANES TO DEPOSIT SOL-GEL COATINGS ON METALS

(75) Inventor: Russell A. Crook, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/351,539

(22) Filed: Jul. 12, 1999

(51) Int. Cl.$^7$ ..................................................... H05K 5/06
(52) U.S. Cl. ......................... 428/626; 428/621; 428/624; 428/470; 428/467; 428/698; 428/420; 361/679
(58) Field of Search .................................. 428/702, 469, 428/698, 467, 701, 447, 470, 624, 344, 346, 626, 420; 156/325; 361/679; 356/240.1; 359/507, 512, 513

(56) References Cited

U.S. PATENT DOCUMENTS

| | | |
|---|---|---|
| 4,497,890 | * 2/1985 | Helbert . |
| 4,967,260 | * 10/1990 | Butt . |
| 5,035,940 | * 7/1991 | Winton et al. . |
| 5,182,143 | * 1/1993 | Holmes-Farley et al. . |
| 5,204,143 | 4/1993 | Nishimiya et al. . |
| 5,869,141 | 2/1999 | Blohowiak et al. . |
| 5,888,850 | * 3/1999 | Havens et al. . |
| 5,939,197 | * 8/1999 | Blohowiak et al. . |
| 6,017,389 | 1/2000 | Schmidt et al. . |

OTHER PUBLICATIONS

*Sol–Gel Science; The Physics and Chemistry of Sol–Gel Processing*, C. Jeffrey Brinker, Albuquerque, New Mexico and George W. Scherer, Wilmington, Delaware, Academic Press, London, pp. 1–13 (date unknown).

*Adhesion Properties and Surface Analyses of Monolayers of n–Dodecanethiol Self–assembled on Galvanic Gold*, Sophie Noël; Camille Bodin, Lionel Boyer, Fredric Houze, Zineb Mekhalif, Joseph Delhalle and Jean–Jacques Pireaux, Surface and Interface Analysis Anal. 26, 889–895 (1998) no month.

*Adhesion Promotors for Gold: Bis–(ω–aminoalkyl)–disulfides*, Martin Glodde, Andreas Hartwig, Otto–Diedrich Hennemann, Wolf–Dieter Stohrer, M. Glodee et al./International Journal of Adhesion & Adhesives 18 (1998) 359–364 no month.

* cited by examiner

Primary Examiner—Blaine Copenheaver
Assistant Examiner—Jennifer McNeil
(74) Attorney, Agent, or Firm—Price, Heneveld, Cooper, DeWitt & Litton (57) ABSTRACT

A method for forming a sol-gel on a metal surface to provide an interface for promoting adhesion between the metal surface and an organic resin involves application of at least one metal alkoxide compound having at least one labile sulfur atom, and at least one metal alkoxide compound having at least one reactive moiety which is capable of bonding with an organic resin. The metal alkoxide compound having at least one labile sulfur atom is capable of bonding to various metal surfaces, including surfaces of noble metals, such as gold, by a sulfur-metal linkage with the metal surface. The metal alkoxide compound having at least one labile sulfur atom reacts with the metal alkoxide compound having at least one reactive moiety which is capable of bonding with the organic resin to form a sol-gel which bonds to the surface of the metal, and which includes reactive moieties which are capable of bonding with an organic resin. The method and coating compositions of this invention are useful for improving the adhesion of various organic resin coatings on various metal surfaces, including noble metal surfaces, such as gold.

20 Claims, 2 Drawing Sheets

MERCAPTOFUNCTIONAL SILANES TO DEPOSIT SOL-GEL COATINGS ON METALS

BACKGROUND OF THE INVENTION

1. Field of the Invention

This invention relates to the field of providing organic polymer coatings on metal surfaces, and more particularly to the field of utilizing sol-gel films as an interface which promotes adhesion between a metal surface and an organic polymer coating.

2. Technical Background

The use of a sol-gel film to produce a metal surface coating suitable as an interface to improve adhesion between the metal surface and an organic matrix resin or adhesive is well known. The sol-gel film provides corrosion resistance to a limited extent and promotes adhesion with an organic resin. A sol is used to produce the sol-gel film on the surface of the metal. Examples of sols which have been used to produce a sol-gel coating on a metal surface include organosilane coupling agents. The sol-gel film is typically applied by immersing, spraying or drenching the metal in or with the sol without rinsing. The sol-gel film includes sites which bond with the metal and separate sites which can bond with an organic resin coating. After application, the sol coating is usually dried such as ambient temperature or, more commonly, at a temperature between ambient and 250° F. (about 120° C.) to complete the sol-gel film formation. Conventional methods of forming a sol-gel film on a metal surface involve the interaction of metal alkoxides with a metal oxide on the surface of the metal to form $M_1$—O—$M_2$, linkages, in which $M_1$ is a metal atom on the surface of the metal which is to be coated, and $M_2$ is a metal atom of a metal alkoxide in the sol. Sol-gel films have been successfully employed as an interfacial layer to promote adhesion between an organic resin and a metal surface. However, useful results have been limited to metals which develop a metal oxide surface, such as aluminum and titanium. Sol-gel films have not been successfully employed as an interfacial layer for promoting good adhesion between an organic polymer coating and the surface of a metal which does not develop a metal oxide surface. Examples of such metals include various noble metals, such as gold, silver, platinum, palladium, iridium, rhenium, ruthenium and osmium.

Therefore, it would be desirable to provide an improved method for forming a sol-gel film on the surface of a metal to promote good adhesion between the surface of the metal and an organic resin coating, especially between an unreactive metal surface, such as the surface of a noble metal, and an organic resin coating.

SUMMARY OF THE INVENTION

The invention pertains to an improved method of forming a sol-gel on a metal surface, to provide an interface for promoting adhesion between the metal surface and an organic polymer coating, and to the resulting sol-gel coated metal surface.

The method involves applying, to a metal surface, at least one metal alkoxide compound having at least one labile sulfur atom, and at least one metal alkoxide compound having at least one reactive moiety which will bond with an organic resin. The labile sulfur atom bonds with the metal surface, and the two metal alkoxide compounds react to form a sol-gel network. The resulting sol-gel can serve as an interface for promoting adhesion between the metal surface and an organic polymer coating.

The invention also pertains to housings for moisture sensitive devices, such as moisture sensitive optical devices, which comprise a plurality of metal plates soldered at their edges to define the housing, wherein an organic polymer coating is applied to at least the exterior surfaces of the housing at the joints to provide a moisture barrier which prevents corrosion at the joints.

DESCRIPTION OF THE PREFERRED EMBODIMENTS

Although the invention may be most advantageously employed to promote good adhesion between an organic polymer coating and the surface of a metal which does not develop an oxide coating, the invention may also be advantageously employed to promote adhesion between an organic polymer coating and other metals which develop metal oxide surfaces, such as steel, aluminum, copper, brass, etc.

After suitable preparation of the metal surface, e.g., cleaning, degreasing, etc., a sol coating composition is applied to the metal surface. The sol coating composition includes at least one metal alkoxide compound which has at least one labile sulfur atom. The labile sulfur atom covalently bonds with a metal atom at the metal surface. The sol coating composition may also contain at least one other metal alkoxide compound which includes at least one reactive moiety which is capable of bonding with an organic resin. Alternatively, the metal alkoxide compound having at least one reactive moiety which is capable of bonding with an organic resin may be applied separately. The metal alkoxides engage in condensation reactions to form a polymer network, which has an inorganic (metal oxide) backbone, on the metal surface. The sol-gel polymer network is tenaciously held to the metal surface by covalent sulfur-metal bonds. The invention is particularly useful for providing a sol-gel interface which promotes adhesion between a relatively inert metal surface, such as a noble metal surface, e.g., gold, silver, platinum, palladium, iridium, rhenium, ruthenium and osmium, and an organic polymer coating.

The expression "sol-gel" is a contraction of the expression "solution-gellation" and refers to a series of reactions where a soluble metal species (typically a metal alkoxide or metal salt) hydrolyzes to form a metal hydroxide. The metal hydroxides condense in solution to form a hybrid organic/inorganic polymer (i.e., a polymer having a backbone comprised of alternating metal and oxygen atoms). Depending on reaction conditions, the metal polymers may be condensed to form colloidal particles or they may form a network gel. The ratio of organics to inorganics in the polymer matrix is controlled to maximize performance for a particular application.

Many metals are known to undergo sol-gel reactions. Silicon and aluminum sol-gel systems have been studied extensively. Representative sol-gel hydrolysis and condensation reactions, using silicon as an example, are shown in equations (1) and (2).

$$Si(OEt)_4 + 2\ H_2O \rightarrow Si(OH)_4 + 4\ EtOH \quad \text{hydrolysis} \qquad (1)$$

$$Si(OH)_4 \rightarrow SiO_2 + 2\ H_2O \quad \text{condensation} \qquad (2)$$

wherein Et is $CH_3CH_2$—. The hydrolysis and condensation reactions can be complete, resulting in complete conversion into the metal oxide or a hydrous metal hydroxide. They can be partial, leaving more of the alkoxide functionalities in the finished gel. Depending upon the reaction conditions, reactions (1) and (2) can produce discrete oxide particulates, as demonstrated in the synthesis of nanoscale particles, or they can form a network gel, which can be exploited in film formation. The solubility of the resulting gel in a solvent will depend upon the size of the particles and degree of network formation.

Figure 1:
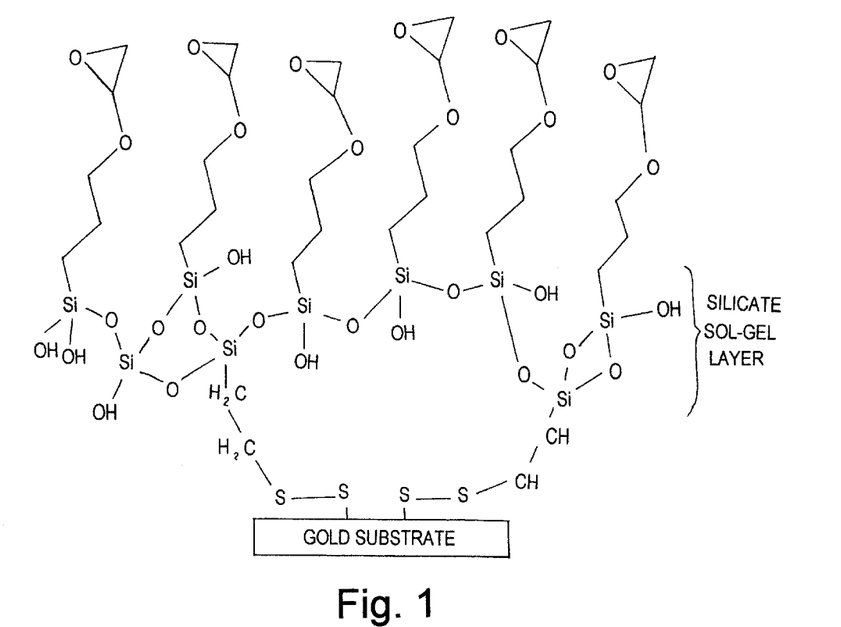
FIG. 1 is a schematic illustration of a sol-gel formed on the surface of a metal.

An important aspect of the invention is the use of a metal alkoxide compound having a labile sulfur atom. The labile sulfur atom provides a mechanism for deposition of an inorganic sol-gel on the surface of noble metals, such as gold, which do not form an oxide layer. Once the metal alkoxide compound having the labile sulfur atom has been applied to the surface of a metal, and the labile sulfur has bonded with a metal atom on the surface of the metal, additional metal alkoxide compounds can react with the metal alkoxide bonded to the surface of the metal, through condensation reactions to form a sol-gel network. FIG. 1 schematically illustrates a sol-gel which is bonded to the surface of a metal. The sol-gel is the reaction product bis[3-(triethoxysilyl)propyl]-tetrasulfide (BTPTS) and gammaglycidoxypropyltrimethoxysilane (GPS). The epoxide groups at the surface of the sol-gel can be covalently bonded to an expoxide or urethane resin or adhesive to form a moisture barrier.

The metal alkoxide compounds having at least one labile sulfur atom can be represented by the following general formula (1):

$$A^1{}_m M^1(OR^1)_n \qquad (1)$$

wherein $A^1{}_m$ represents m number of organic functional groups ($A^1$) which may be the same or different, with at least one of the $A^1$ organic functional groups including at least one labile sulfur atom, $M^1$ represents a metal atom, $(OR^1)_n$ represents n number of hydroxy and/or alkoxy groups which may be the same or different, such that each $R^1$ represents a hydrogen atom or an alkyl group, and m and n each represent a positive integer, with the sum of m +n being equal to the valence of the metal ($M^1$).

Alternatively, metal alkoxide compounds having at least one labile sulfur atom which may be used in the sol coating can be represented by the following general formula (2):

$$A^2{}_{m^2}(OR^2)_{n^2}M^2 - A^4 - M^3(OR^3)_{n^3}A^3{}_{m^3} \qquad (2)$$

wherein $A^2{}_m$ represents $m^2$ number of organic functional groups ($A^2$) which may be the same or different, $M^2$ and $M^3$ each represent a metal atom which can be the same or different, $(OR^3)_{n^2}$ represents $n^2$ number of hydroxy and/or alkoxy groups which may be the same or different, whereby $R^2$ represents a hydrogen atom or an alkyl group, $A^4$ represents a divalent organic functional group having at least one labile sulfur atom, $A^3{}_{m^3}$ represents $m^3$ number of organic functional groups ($A^3$) which may be the same or different, $(OR^3)_{n^3}$ represents $n^3$ number of hydroxy and/or alkoxy groups which may be the same or different, $m^2$ is zero or a positive integer and $n^2$ is a positive integer, with the sum of $1+m^2+n^2$ being equal to the valance of metal $M^2$, and $m^3$ is zero or a positive integer and $n^3$ is a positive integer, with the sum $1+m^3+n^3$ being equal to the valance of metal $M^3$.

The labile sulfur atom of the organic functional group(s) $A^1, A^2, A^3$ and/or $A^4$ may be part of a thiol group (—SH) or part of a polysulfide group (—$S_x$—, wherein x is an integer greater than or equal to 2) including at least one sulfur-sulfur linkage. For example $A^1, A^2, A^3$ may be alkylthiol groups, and $A^4$ may be a divalent moiety of the form R—$S_x$—R', wherein R and R' are alkenyl groups which may be the same or different and x is at least 2.

The metal alkoxide compounds having at least one labile sulfur atom wherein a part or all of the alkoxy groups of the general formulae (1) and (2) are replaced by a halogen atom may be used in the invention. In addition, the metal alkoxide compounds having at least one labile sulfur atom wherein a part or all of the alkoxy groups in the general formulae (1) and (2) are hydrolyzed and condensed to form a metal-oxygen-metal bond can be used in the invention.

A mixture of the metal alkoxide compounds of formulae (1) and (2) may also be used in the invention.

The metal $M^1$, the metal $M^2$, and the metal $M^3$ in formulae (1) and (2) may be any of Li, Na, K, Rb, Cs, Be, Mg, Ca, Sr, Ba, Sc, Y, rare earth metals, Ti, V, Cr, Mn, Fe, Co, Ni, Cu, Zn, Zr, Nb, Mo, Hf, Ta, W, Ru, Rh, Pd, Ir, Pt, B, Al, Ga, In, Tl, Si, Ge, Sn, Pb, P, As, Sb, and Bi. Among them, Al, Si and Ti are preferred.

Metal alkoxide compounds having at least one labile sulfur atom which are represented by formula (1) are preferably compounds containing only a single $A^1$ group, which contains at least one labile sulfur atom, preferably a thiol (—SH) group. Metal alkoxide compounds having at least one labile sulfur atom in accordance with formula (2) preferably do not include any $A^2$ or $A^3$ groups (i.e., $m^2$ and $m^3$ each are zero), and $A^4$ includes a polysulfide having at least one sulfur-sulfur linkage. A specific example of a metal alkoxide compound having at least one labile sulfur atom in accordance with formula (1) is (3-mercaptopropyl) trimethoxysilane, which has the formula $HS(CH_2)_3Si(OCH_3)_3$. A specific example of a metal alkoxide compound having at least one labile sulfur atom in accordance with formula (2) is bis[3-(triethoxysilyl)propyl]-tetrasulfide.

The $R^1, R^2$ and $R^3$ groups of the general formulae (1) and (2) each represent a hydrogen atom, an alkyl group, or a functional group which can be replaced with an alkyl group in an organic solvent. When two or more alkoxy and/or hydroxy groups are used, the $R^1, R^2$ and $R^3$ groups may be the same as or different from each other. The alkyl group may be any of linear, branched or cyclic forms. Examples include methyl, ethyl, n-propyl, i-propyl, n-butyl, sec-butyl, tert-butyl, and a cyclohexyl group.

The organic functional groups $A^1, A^2$ and $A^3$, which do not contain a labile sulfur atom may be selected from hydrogen, an alkyl group, an aryl group, an alkaryl group, an alkoxy group, etc.

The metal alkoxide compound having a reactive moiety which is capable of bonding with an organic resin has the general formula (3):

$$B_b M^4 (OR^4)_q \qquad (3)$$

where $B_b$ represents b number of organic functional groups which may be the same or different, with at least one of the B groups having a reactive moiety which is capable of bonding with an organic resin, $M^4$ represents a metal, $(OR^4)_p$ represents p number of hydroxy or alkoxy groups which may be the same or different, with each $R^4$ representing a hydrogen atom or an alkyl group, and b and p each represent a positive integer, with the sum of b+p being equal to valance of metal ($M^4$).

Examples of B groups having a reactive moiety which is capable of bonding with an organic resin include organic groups having an epoxy moiety (which is capable of bonding to an epoxy resin or a urethane resin), or a primary amine (which is capable of bonding to a polyimide resin).

The metal ($M^4$) can be selected from the same group of metals which are listed above for metal $M^1$, with preferred metals for $M^4$ including Al, Si and Ti.

The $R^4$ groups may be alkoxy or hydroxy groups, with suitable alkoxy group being the same as those previously described with respect to formulae (1) and (2).

Examples of metal alkoxide compounds having at least one reactive moiety which is capable of bonding with an organic resin include 3-aminopropyltriethoxysilane, 3-glycidoxypropyltrimethoxlysilane, p-aminophenylsilane, allyltrimethoxysilane, n-(2-aminoethyl)-3-aminiopropyltrimethoxsilane, 3-glycidoxypropyldiisopropylethoxysilane, 3-glycidoxypropylmethyldiethoxysilane, 3-glycidoxypropyltrimethoxysilane, 3-methacryloxypropyimethyldiethoxysilane, 3-methacryloxypropylmethyldimethoxysilane, 3-methacry:.oxypropyltrimethoxysilane, n-phenylaminopropyltrimethoxysilane, vinylethyldiethoxysilane, vinyltriethoxysilane and vinyltrimethoxysilane. The allyl and vinyl functional metal alkoxide compounds are capable of reacting with an ethylenically unsaturated monomer, oligomer, polymer, and/or cross linking agent in an organic resin system.

The sol coating may also contain an organometallic compound represented by the following general formula (4):

$$M^5(OR^5)_q \qquad (4)$$

wherein $M^5$ represents a metal, $(OR^5)_q$ represents q number of hydroxy and/or alkoxy groups which may be the same or different, with $R^5$ representing a hydrogen atom or an alkyl group, and q is a positive integer equal to the valance of metal $M^5$.

Metal $M^5$ may be selected from any of the metals listed above for $M^1$, $M^2$ and $M^3$ in formulae (1) and (2), with $A_1$, $S_i$, and $T_i$ being preferred.

The sol coating compositions of this invention may contain a combination of one or more metal alkoxide compounds having at least one labile sulfur atom, including combinations of metal alkoxide compounds in accordance with formulae (1) and/or (2), one or more metal alkoxide compounds having at least one reactive moiety which is capable of bonding with an organic resin (e.g., a metal alkoxide compound in accordance with formula (3) which includes at least one group B having at least one reactive moiety which is capable of bonding with an organic resin), and may optionally contain an organometallic compound of formula (4) (e.g., tetraethyl orthosilicate). In addition, the sol coating composition may include partially or fully hydrolyzed compounds of formulae (1) through (4) and condensation products thereof.

Organic solvents which are suitable for preparing the sol coating composition include methanol, ethanol, iso-propanol, hexane, cyclohexane, benzene, toluene, 1,4-dioxane, tetrahydrofuran, methyl ethyl ketone, ethylene glycol dimethyl ether, ethylene glycol monomethyl ether, ethylene glycol diethyl ether, propylene glycol monomethyl ether, acetyl acetone, N,N-dimethylformamide and monoethanol amine. Organic solvents can be used singly or in combination.

Water is preferably added to the organic solvent in an amount of from about 0.5 to about 1,000 mol per mol of the metal alkoxide compound. When the amount of water is too low, hydrolysis and subsequent polycondensation reactions proceed slowly and several days are usually necessary to complete treatment of a metal surface. When the amount of water is too high, adhesion of the resulting sol-gel to the metal surface can be poor, and storage stability of the composition may also be poor.

Hydrolysis and condensation reactions of the metal alkoxide compounds can be performed at temperatures ranging from about room temperature (e.g., about 20° C.) to about 100° C. It may also be possible to conduct the reaction at a temperature higher than the boiling point of the solvent by means of a reflux condenser.

The time needed for the hydrolysis and condensation reactions varies depending on the reaction temperature.

Catalysts may be added to the sol coating composition if needed or desired. Suitable catalysts include acids such as hydrochloric acid and acetic acid, and bases such as ammonia and tetraethylammonium hydroxide. The amount of catalyst is usually from about 0.01 to about 0.1 mol per mol of the metal alkoxide compounds.

When the sol coating composition comprising the metal alkoxide compounds, the organic solvent, and, if necessary, catalysts, is subjected to a suitable reaction temperature for a suitable reaction time, hydrolysis and condensation reactions occur to form a polymer network having an inorganic backbone, pendant groups having sulfur atoms bonded to the metal surface, and pendant organic moieties which are capable of forming covalent bonds with an organic resin system.

After the sol coating composition has been applied to the metal surface, it may be dried with heated air. The polymer polycondensation product, which comprises a backbone having metal-oxygen-metal bonds, is gelled and adhered to the metal surface. Drying is conducted to evaporate the organic solvent, any remaining water, and, in some cases, the catalysts. The sol coating composition can be applied to the metal surface by brushing, dipping, atomizing, spin coating, doctor blade coating or the like. The application method may be suitably selected depending on the shape of the metal surface and intended thickness of the sol-gel film.

The sol coating composition is prepared by mixing the organic solvent, water, the required metal alkoxide compounds and any desired optional metal alkoxide compounds, and any optional catalysts, if needed or desired.

The relative rates of the hydrolysis and condensation reactions involved in the gelling process are controlled by the type of catalysts (either acid or base), if any, the concentration of the metal alkoxide compounds, the particular metal alkoxide compounds selected, and the amount of water available for hydrolysis. An acidic catalyst promotes the hydrolysis reaction over condensation, while a basic catalyst does the opposite.

An application of the invention involves using the sol coating composition described above as an interface for bonding a water-resistant organic polymer to the surface of a metal. For example, the sol coating composition can be applied to a metal plating 10, such as a gold platting, plated on a base metal 12, such as a nickel alloy (e.g., Kovar nickel alloy), and allowed to reacd to form a sol-gel film 16. The sol-gel 16 is securely bonded to the gold surface by labile sulfur atoms of a metal alkoxide compound, and the sol-gel includes reactive moieties which are capable of bonding with an organic resin. A corrosion resistant organic polymer composition is subsequently applied to the sol-gel film and is firmly bonded thereto by reaction with the reactive moieties of a second metal alkoxide compound. The moisture resistant organic polymer which is bonded to the plated metal surface by the sol-gel film forms a moisture barrier which prevents water from reaching the interface between the base metal and the platting, thereby preventing corrosion and degradation of the platting. Such applications are useful for preventing corrosion on housings for optical devices containing moisture sensitive components.

Figure 3:
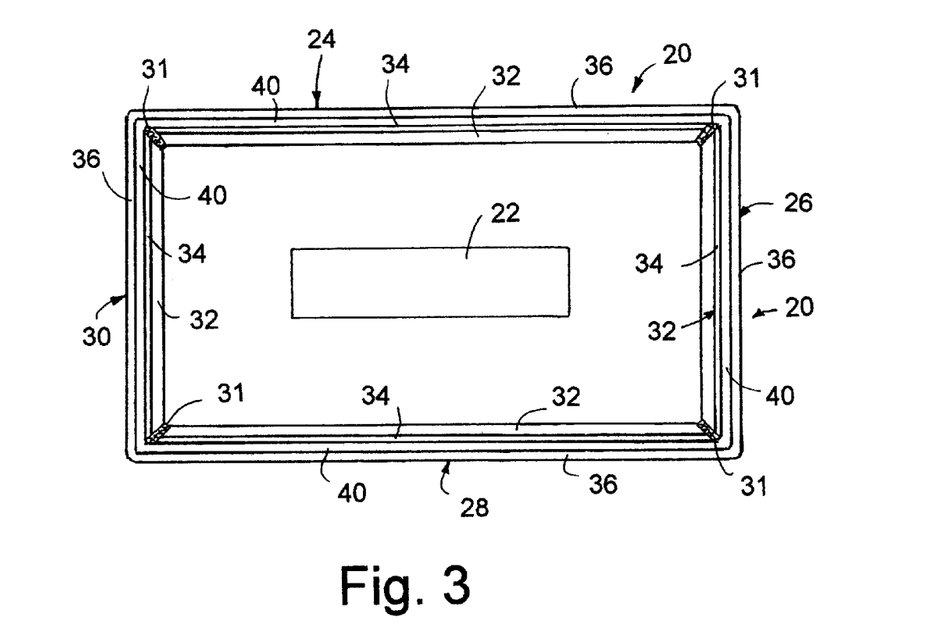
FIG. 3 is a schematic representation of a housing for an optical device, in which the surfaces of the walls of the housing have been treated with a sol-gel to enhance adhesion with a protective organic polymer coating.

A particular application is shown in FIG. 3, wherein a housing 20 is provided for an optical device 22, such as for transmitting or processing a light signal, which is sensitive to moisture. The housing is comprised of a plurality of metal plate walls 24, 26, 28, 30 which are soldered together. Each of the metal walls 24, 26, 28 and 30 includes a base metal 32 (e.g., a metal which develops an oxide layer at its surface), and a plating 34 (e.g., a gold plating). At the solder joints 31, an alloy of gold and nickel forms. On account of an high electrochemical potential between nickel and gold, the joints are subject to corrosion when exposed to moisture. In accordance with the invention, an organic polymer layer 36 which acts as a moisture barrier is provided at least in the area of the soldered joints to prevent corrosion. To improve adhesion between plating 34 and organic polymer layer 36, a sol-gel 40 is provided at the interface between plating 34 and organic polymer 35. The improved adhesion provides enhanced integrity against moisture penetration and protects the interface between plating 34 and base metal 32, thereby preventing corrosion and degradation of the housing 20. The sol-gel and organic coating may be applied over the entire outer surface of the housing, but is preferably applied to at least the exterior of the soldered joints. The invention will be further clarified by the following examples which are intended to be exemplary of the invention.

EXAMPLE 1

This example demonstrates corrosion prevention for gold plated stainless steel. An electrochemical couple exists between gold and another non-noble metal, such as stainless steel, on which it is plated. For example, the EMF between gold and stainless steel is 1.59 volts. The electrochemical reaction will proceed only in the presence of water, resulting in corrosion and degradation of the gold plate.

A sol coating comprising bis[3-(triethoxysilyl)propyl]-tetrasulfide (BTPTS) and gamma-glycidoxypropyltrimethoxysilane (GPS) is applied to the gold plate. The BTPTS and GPS are reacted to form a sol-gel film which creates a means of enhancing the durability of the bond between the gold surface and a moisture resistant organic polymer layer. The improved bonding between the organic coating and the gold surface excludes moisture from the interface and prevents corrosion.

Gold plated 304 stainless steel specimens, having dimensions of 50 millimeters by 13 millimeters by 1 millimeter, were ultrasonically cleaned and treated with a solution containing a solvent mixture comprising 40% cyclohexane, 40% ethanol, 10% n-butanol, 5% silane in deionized pH 5.0 buffered water, and 5% 2-butoxyethanol. The silane composition consisted of equal equivalents of BTPTS and GPS.

Various sol coating compositions were prepared in which the silane concentration was adjusted from zero to 5% by weight while holding the ratio of the two silanes constant. The organic material coating used in this example was Duralco 4525 (Contronics Inc., Brooklyn N.Y. This material has a water vapor transmission rate of $2.811 \times 10^{31}$ $^7$g/hour/mm$^2$. After coating the gold plated substrates with the silanes, the substrates were dried at 85° C. for one hour. Thereafter, two specimens were bonded with Duralco 4525 and cured at 170° F. A second set of bonded specimens were placed in a 40° C. water bath for seven days, removed and tested.

Figure 2:
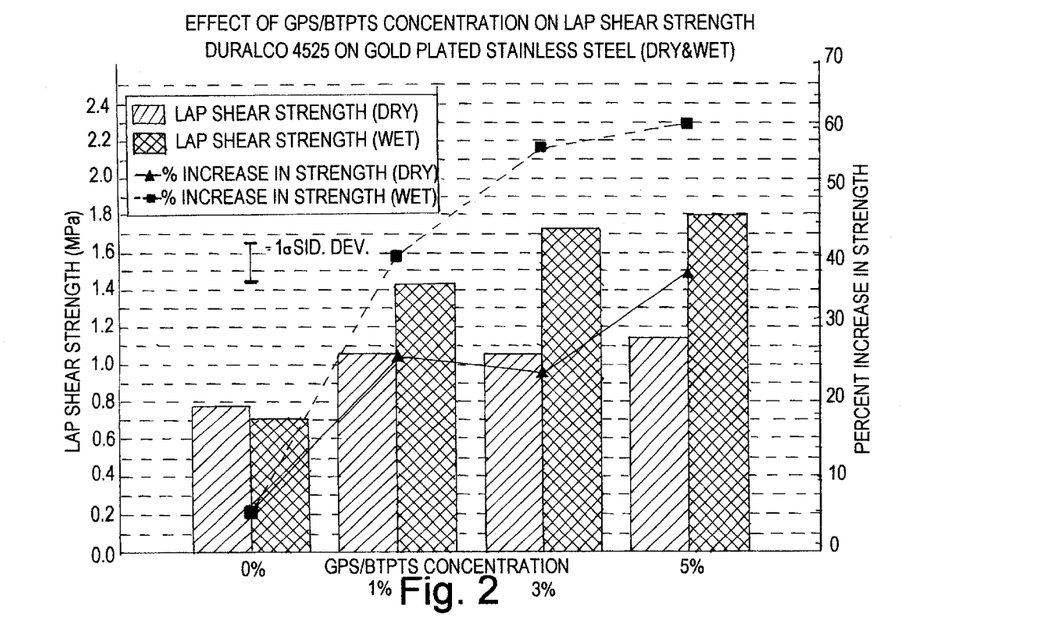
FIG. 2 shows lap shear strength data in graphical form for an organic polymer bonded to a gold plated nickel substrate base, which data illustrates the effect of metal alkoxide concentration in a sol used to form a sol-gel interface between the gold surface and the organic polymer.

FIG. 2 shows the lap shear strength of gold plated 304 stainless steel bonded with Duralco 4525 with, and without, wet conditioning. The data shows the effect of silane concentration on "as bonded" dry conditioning. The data shows that lap shear strength gradually increases to a maximum of 1.7 Mpa at 5% silane, which represents a 40% improvement as compared with no silane. The failure mode for all silane concentrations was 100% along the gold-adhesive interface except at the 5% silane level in which some thin film cohesive failure was observed.

Conditioning the specimens at 40° C. for seven days caused up to a 60% increase in the lap shear strength when compared to the zero silane wet condition specimens. The zero silane specimens (wet and dry) showed similar average lap shear strength. The failure mode for all of the wet conditioned specimens was mostly interfacial at the gold adhesive interface with increasing thin film cohesive failure at the 5% level. It is believed that the enhanced strength performance is due to the more complete formation of the sol-gel network in the sol-gel layer.

EXAMPLE 2

This example involves deposition of metal alkoxides to selectively bond metal sol-gel surfaces. Because gold and other noble metals do not have a metal oxide coating, direct application of silicate, zirconate, germanate and titanate sol-gels will not adhere to the surfaces. Accordingly, the surfaces of these metals may be selectively modified by applying a sol coating composition containing a metal alkoxide compound having at least one labile sulfur atom (e.g., a mercapto functionalized silane) in the presence of, or prior to subsequent addition of, another metal alkoxide.

EXAMPLE 3

A series of housings were prepared for fiber Bragg gratings to evaluate the moisture resistance of optical device housings utilizing the sol-gel coating compositions of this invention. Fiber Bragg gratings were attached to moisture resistant ceramic substrates having a negative coefficient of thermal expansion. Each Bragg grating mounted on a substrate was placed in a gold/Kovar box, and sealed with solder in a helium/nitrogen environment. Housings with various lids, with and without coatings at the seams, and with and without an absorbent (zeolite ZSM-5) within the housing, were prepared. The change (or drift) of the center wave-length shift of the fiber Bragg grating for each sample was measured as a function of time the housing is maintained at 85° F. at 85% relative humidity. A drift in excess picometers (pm) is unacceptable. As can be seen from the data shown in Table 1, only the samples of Experiment No. 7, in which an organic polymer coating is held to a gold plated nickel lid with the sol coating composition of Example 1 (containing BTPTS and GPS), exhibited an acceptable level of drift (−3 to +7 pm) after 1300 whereas the Bragg gratings in the other experiments exhibited unacceptable levels of drift between 624 hours and 1128 hours in an environment maintained at a temperature of 85° F. and at a relative humidity of 85%.

TABLE 1

| Exper. | Samples | Absorbent | Lid Material | Lid Dimen. | Hours | Drift range (pm) |
|---|---|---|---|---|---|---|
| 1 | 5 | No | Au/Ni | 15 mil | 930 | −142 to +78 |
| 2 | 6 | Yes | Au/Ni | 15 mil | 980 | −16 to +148 |
| 3 | 6 | Yes | Au/Ni | 20 mil | 624 | −10 to +180 |
| 4 | 6 | Yes | Au/Ni | 20 mil | 624 | +27 to +179 |
| 5 | 5 | No | Kovar | 15 mil | 1128 | +20 to +144 |
| 6 | 5 | No | Ni | 15 mil | 1128 | −9 to +62 |
| 7 | 3 | Yes | Au/Ni (Durelco) | 20 mil | 1300 | −3 to +7 |
| 8 | 3 | Yes | Au/Ni (Mca106) | 20 mil | 1100 | −1382 to +5 |
| 9 | 5 | Yes | Au/Ni | 20 mil | 1110 | −132 to +78 |

It will be apparent to those skilled in the art that various modifications and adaptations can be made to the present invention without departing from the spirit and and scope of the invention. Thus, it is intended that the present invention cover the modifications and adaptations of this invention, provided they come within the scope of the appended claims and their equivalents.

What is claimed is:

1. A laminate structure comprising:
   a metal layer;
   a sol-gel layer adhered to the surface of the metal layer, the sol-gel including the reaction product of at least one metal alkoxide compound having at least one labile sulfur atom; and
   at least one metal alkoxide compound having at least one reactive
   moiety which is capable of bonding with an organic resin.

2. The laminate structure of claim 1 wherein the metal alkoxide compound having at least one labile sulfur atom includes a thiol reactive moiety.

3. The laminate structure of claim 1 wherein the at least one metal alkoxide compound having at least one labile sulfur atom includes a polysulfide moiety.

4. The laminated structure of claim 1 in which the at least one reactive moiety of the metal alkoxide compound having at least one reactive moiety is selected from a vinyl moiety, a allyl moiety, an epoxy moiety, and an amine moiety.

5. A housing for a moisture sensitive device comprising:
   a metal wall having a base metal layer and a metal plating layer on the base metal layer;
   a sol-gel layer bonded to the metal plating layer, and
   an organic polymer layer bonded to the sol-gel layer, the sol-gel layer being the reaction product of at least one metal alkoxide compound having at least one labile sulfur atom with at least one metal alkoxide compound having at least one moiety bonded with the organic polymer layer, the labile sulfur atom of the at least one metal alkoxide compound being bonded to the metal plating layer.

6. The housing of claim 5 wherein the base metal is a metal which forms an oxide layer at its surface, and wherein the plating layer is a noble metal.

7. The housing of claim 6 wherein the noble metal is gold.

8. The housing of claim 7 wherein the device is an optical device for transmitting or processing a light signal.

9. The housing of claim 5 wherein the metal alkoxide compound having at least one labile sulfur atom includes a thiol reactive moiety.

10. The housing of claim 5 wherein the at least one metal alkoxide compound having at least one labile sulfur atom includes a polysulfide moiety.

11. The housing of claim 5 in which the at least one reactive moiety of the metal alkoxide compound having at least one reactive moiety is selected from a vinyl moiety, a allyl moiety, an epoxy moiety, and an amine moiety.

12. A housing for a moisture sensitive device comprising:
   a plurality of metal walls, each wall having a base metal layer and a metal
   plating layer plated on the base metal, the walls being soldered at their edges to form joints which include an alloy of the base metal and the plating metal; and
   an organic polymer coating applied to at least the exterior surfaces of the housing at the soldered joints to provide a moisture barrier which prevents corrosion at the joints.

13. The housing of claim 12 wherein a sol-gel is disposed between the organic polymer and the exterior surfaces of the housing to promote adhesion between the exterior surfaces of the housing and the organic polymer coating.

14. A housing for a moisture sensitive device comprising:
   a plurality of metal walls, each wall having a base metal layer and a metal plating layer plated on the base metal, the walls being soldered at their edges to form joints which include an alloy of the base metal and the plating metal; and
   an organic polymer coating applied to at least the exterior surfaces of the housing at the soldered joints to provide a moisture barrier which prevents corrosion at the joints;
   wherein a sol-gel is disposed between the organic polymer and the exterior surfaces of the housing to promote adhesion between the exterior surfaces of the housing and the organic polymer coating; and
   wherein the sol-gel is the reaction product of at least one metal alkoxide compound having at least one liable sulfur atom with at least one metal alkoxide compound having at least one moiety bonded with the organic layer.

15. The housing of claim 14 wherein the plating is gold and the base metal is a nickel alloy.

16. The housing of claim 15 wherein the metal alkoxide compound having at least one labile sulfur atom includes a thiol reactive moiety.

17. The housing of claim 16 in which the at least one reactive moiety of the metal alkoxide compound having at least one reactive moiety is selected from a vinyl moiety, a allyl moiety, an epoxy moiety, and an amine moiety.

18. The housing of claim 15 wherein the at least one metal alkoxide compound having at least one labile sulfur atom includes a polysultide moiety.

19. The housing of claim 18 in which the at least one reactive moiety of the metal alkoxide compound having at least one reactive moiety is selected from a vinyl moiety, a allyl moiety, an epoxy moiety, and an amine moiety.

20. A housing for a moisture sensitive device comprising:

a plurality of metal walls, each wall having a base metal layer and a metal plating layer plated on the base metal, the walls being soldered at their edges to form joints which include an alloy of the base metal and the plating metal; and an epoxy or urethane resin coating applied to at least the exterior surfaces of the housing at the soldered joints to provide a moisture barrier which prevents corrosion at the joints; and wherein a sol-gel is disposed between the epoxy or urethane resin coating and the exterior surfaces of the housing to promote adhesion between the exterior surfaces of the housing and the epoxy or urethane resin coating.

* * * * *

UNITED STATES PATENT AND TRADEMARK OFFICE
CERTIFICATE OF CORRECTION

PATENT NO. : 6,284,391 B1
DATED : September 4, 2001
INVENTOR(S) : Russell A. Crook It is certified that error appears in the above-identified patent and that said Letters Patent is hereby corrected as shown below:

Column 1,
Line 27, after "as" insert -- at --.

Column 4,
Line 27, "TI" should be -- Ti --.
Line 61, "$B_b M^4 (OR^4)_q$" should be -- $B_b M^4 (OR^4)_p$ --.

Column 5,
Line 25, "3-methacry:.oxypropyltrimethoxysilane" should be -- 3-methacryloxypropyltrimethoxysilane --.

Column 6,
Line 60, "platting" should be -- plating --.

Column 7,
Lines 6 and 7, "platting" should be -- plating --.
Line 26, "35" should be -- 36 --.
Line 65, after "Brooklyn" insert -- , --.
Line 65, after "N.Y." insert -- ) --.
Lines 66 and 67, "$2.811 \times 10^{317}$ g/hour/mm$^2$." should be -- $2.811 \times 10^{-7}$ g/hour/mm$^2$. --.

Column 8,
Lines 23 and 24, "gold adhesive" should be -- gold-adhesive --.
Line 63, after "1300" insert -- hours, --.

Column 9,
Line 17, delete "and" second occurrence.
Line 40, "a" should be -- an --.

UNITED STATES PATENT AND TRADEMARK OFFICE
CERTIFICATE OF CORRECTION

PATENT NO. : 6,284,391 B1
DATED : September 4, 2001
INVENTOR(S) : Russell A. Crook It is certified that error appears in the above-identified patent and that said Letters Patent is hereby corrected as shown below:

<u>Column 10,</u>
Line 15, "a" should be -- an --.
Lines 59 and 60, "a allyl" should be -- an allyl --.
Line 63, "polysultide" should be -- polysulfide --.
Lines 66 and 67, "a allyl" should be -- an allyl --.

Signed and Sealed this

Tenth Day of September, 2002

*Attest:*

JAMES E. ROGAN
*Attesting Officer*    *Director of the United States Patent and Trademark Office*